United States Patent [19]

Duchesne et al.

[11] Patent Number: 4,517,035
[45] Date of Patent: May 14, 1985

[54] METHOD OF MAKING A CASTABLE PROPELLANT

[75] Inventors: Gonzague L. Duchesne; Guy Perrault, both of Ste-Foy, Canada

[73] Assignee: Her Majesty, the Queen in right of Canada, as represented by the Minister of National Defence, Ottawa, Canada

[21] Appl. No.: 575,727

[22] Filed: Feb. 3, 1984

Related U.S. Application Data

[60] Division of Ser. No. 213,670, Dec. 5, 1980, abandoned, which is a continuation of Ser. No. 888,542, Mar. 21, 1978, Pat. No. 4,427,468, which is a continuation-in-part of Ser. No. 803,992, Jun. 6, 1977, abandoned, which is a continuation-in-part of Ser. No. 663,214, Mar. 3, 1976, abandoned.

[30] Foreign Application Priority Data

| Jan. 16, 1976 [CA] | Canada | 243659 |
| Jan. 4, 1977 [NO] | Norway | 770011 |
| Dec. 13, 1977 [CA] | Canada | 292954 |

[51] Int. Cl.³ ............................................ C06B 45/10
[52] U.S. Cl. .................................................. 149/19.92
[58] Field of Search ................ 149/19.92, 19.9, 19.4

[56] References Cited

U.S. PATENT DOCUMENTS

| 3,695,952 | 10/1972 | Allen | 149/19.9 |
| 3,741,830 | 6/1973 | Wall | 149/19.9 |
| 3,745,074 | 7/1973 | Allen | 149/19.9 |
| 3,762,972 | 10/1973 | Allen | 149/19.9 |
| 3,792,003 | 2/1974 | Duchesne et al. | 149/19.4 |
| 3,801,385 | 4/1974 | Mastrolia et al. | 149/19.9 |
| 3,932,240 | 1/1976 | Braun et al. | 149/19.4 |
| 3,984,265 | 10/1976 | Elrick et al. | 149/19.9 |
| 3,986,906 | 10/1976 | Sayles | 149/19.4 |
| 4,042,619 | 8/1977 | Miegel | 149/19.9 |
| 4,070,213 | 1/1978 | Cucksee et al. | 149/19.9 |
| 4,090,893 | 5/1978 | Cucksee et al. | 149/19.9 |
| 4,156,700 | 5/1979 | Tremblay et al. | 149/19.9 |
| 4,158,583 | 6/1979 | Frosch | 149/19.9 |

FOREIGN PATENT DOCUMENTS 891562  1/1972  Canada .

OTHER PUBLICATIONS

Perrault et al., *J. Appl. Polym. Sci.*, 18, pp. 1295–1304, (1974).
Perrault et al. II, "Polyester Azotes", DREV R. 639/71, (1971), Defense Research Board, Que., Can.

*Primary Examiner*—Edward A. Miller
*Attorney, Agent, or Firm*—Cushman, Darby & Cushman

[57] ABSTRACT

A curable binder for use in forming a castable propellant of the hydroxy-terminated polybutadiene type which uses a combination of two bonding agents, an aziridine polyester and an amine polyester. The amount of aziridine polyester is reduced by a factor of 3 to 4 compared to known systems. Improved propellant properties, including elongation at maximum load and at rupture, while maintaining comparable tensile strength and initial moduli, are obtained. A diisocyanate curing agent, an antioxidant such as di-tert-butylhydroquinone or phenyl-beta-naphthyl amine and combinations of antioxidants, and isodecyl pelargonate as a plasticizer, may be included.

8 Claims, 6 Drawing Figures

EFFECT OF PREPOLYMER TYPE ON THE POT LIFE OF HTPB PROPELLANTS

EFFECT OF PREPOLYMER TYPE ON THE POT LIFE OF HTPB PROPELLANTS

FIG.1

EFFECT OF ANTIOXIDANTS ON THE POT LIFE OF HTPB PROPELLANTS BASED ON R-45HT (PREPOLYMER LOT 403245)

FIG. 2

EFFECT OF FLEXZONE 6H AND DTBHQ ANTIOXIDANTS ON THE POT LIFE OF HTPB PROPELLANTS (R-45HT PREPOLYMER LOT 606095)

FIG.3

EFFECT OF MIXTURE OF ANTIOXIDANTS ON THE POT LIFE OF HTPB PROPELLANTS (R-45HT PREPOLYMER LOT 606095)

FIG. 4

EFFECT OF UOP-36 AND FLEXZONE 6H ON THE POT LIFE OF HTPB PROPELLANTS (R-45HT PREPOLYMER LOTS 403245 AND 606095)

FIG. 5

EFFECT OF PAZ/PAM BONDING AGENTS ON POT LIFE OF HTPB PROPELLANTS (R-45HT PREPOLYMER, LOT 606095; ANTIOXIDANT TYPE D)

FIG. 6

METHOD OF MAKING A CASTABLE PROPELLANT

This application is a divisional of earlier application Ser. No. 213,670 filed Dec. 5, 1980, now abandoned, which in turn is a continuation of copending application Ser. No. 888,542 filed Mar. 21, 1978, now U.S. Pat. No. 4,427,468, which in turn is a continuation-in-part of copending application Ser. No. 803,992 filed June 6, 1977, now abandoned, which in turn is a continuation-in-part of copending application Ser. No. 663,214 filed Mar. 3, 1976, now abandoned.

This invention relates to composite solid propellants more particularly to an improved hydroxy-terminated polybutadiene (HTPB) binder system for such propellants which includes a combination of two bonding agents.

Castable propellants using polybutadiene-based binders in conjunction with, for example, ammonium perchlorate oxidizer are well known. The mechanical and ballistic properties of such composite solid propellants are very dependent upon the quality of the adhesive bond between the binder and the oxidizer, as discussed in U.S. Pat. No. 3,745,074 issued July 10, 1973, to Allen. In the prior art, systems are known which have reasonably good adhesion between the fuel binder and oxidizer but such systems have other disadvantages.

One such system utilizes carboxyl-terminated polybutadiene (CTPB) binders cured with a system involving aziridines or epoxides or a mixture thereof. Propellants using such binder systems have high elongation over a wide temperature range and a relatively high ability to carry solid particles, referred to as solid loading. The binder-oxidizer adhesion is fairly good as the preferred aziridine curing agent, tris(2-methyl aziridinyl-1)phosphine oxide known as MAPO, polymerizes around the ammonium perchlorate oxidizer particles to form a strong layer linked to the main portion of the binder by chemical bonds. However, this system has the disadvantages that it involves a complicated curing system, the propellants have poor aging characteristics when exposed to high temperature, and the properties of the polymer binder vary from one batch to another.

Another system which was developed in an attempt to overcome the disadvantages of the foregoing system is that of the HTPB-based composite propellants, which utilizes hydroxy-terminated polybutadiene prepolymers. These systems are cured with diisocyanates. These propellants required the use of a bonding agent to provide good adhesion of the binder to the oxidizer particles. Aziridine polyesters are efficient bonding agents for these propellants, a preferred aziridine polyester being a reaction product of MAPO with diacids. However, this preferred bonding agent must be synthesized on site in relatively small quantities as it has a short shelf life at room temperature and must be kept at low temperature to prolong its usefulness, and a relatively high concentration is required, about 2 to 3 percent of aziridine polyester in the binder, to provide efficient adhesion between the oxidizer and binder particularly when the solid loading is high.

The present invention is based on the finding that a combination of two bonding agents, an aziridine polyester and an amine polyester, with the HTPB-type propellants provides proper adhesion to maintain the stress-strain capability of the propellant, and enables a reduction by a factor of 3 to 4 in the amount of aziridine polyester required as compared to the known systems. Propellant systems according to the present invention have for example enhanced mechanical properties, including improved elongation at maximum load and at rupture with comparable tensile strength and initial moduli with reference to HTPB propellant systems utilizing only aziridine polyester bonding agent.

Thus, in one embodiment the invention provides a curable binder for use in forming a castable propellant which comprises:

a. a hydroxy-terminated butadiene polymer,
b. a diisocyanate curing agent, and
c. a bonding agent system of an aziridine polyester which is the reaction product of an aziridinyl phosphine oxide and at least one polycarboxylic acid, and an amine polyester with is the reaction product of an alkanolamine and a saturated aliphatic polycarboxylic acid. Additionally, antioxidants such as di-terbutylhydroquinone or phenyl-beta-naphthyl amine may be included, together with isodecyl pelargonate as a platicizer. The use of combinations of various antioxidants is also envisaged.

The invention further provides a castable propellant utilizing the aforementioned binder and having dispersed therethrough a finely divided perchlorate oxidizer in di or trimodal distributions, and other optional ingredients such as a metal additive.

The invention still further provides a method for preparation of the composite propellant which provides good dispersion of the ingredients, and reproducibility in processing, mechanical and ballistic properties, said method comprising:

(a) mixing together liquid ingredients comprising a hydroxy-terminated butadiene prepolymer, a plasticizer and a bonding agent system of an aziridine polyester which is the reaction product of an aziridinyl phosphine oxide and a polycarboxylic acid, and an amine polyester which is the reaction product of an alkanolamine and a saturated aliphatic polycarboxylic acid, at atmospheric pressure, (b) adding solid ingredients comprising finely divided aluminum metal, ferric oxide as burning rate catalyst and about 75% of the total amount of ammonium perchlorate oxidizer, and mixing to substantially even dispersion, (c) heating at about 60° C. under vacuum for about 1 hour, (d) releasing the vacuum,

(e) adding the remainder of the ammonium perchlorate oxidizer and a diisocyanate curing agent, and mixing (f) reapplying vacuum and heating to about 60° C. for about 45 minutes.

(g) casting the resulting mixture into molds under vacuum,

The HTPB prepolymers suitable for use in the binder and propellant systems according to the present invention are, for example, of the type described in Canadian Pat. No. 891,562 issued Jan. 25, 1972, to Boivin and Tremblay, and U.S. Pat. No. 3,792,003 issued Feb. 12, 1974, to Duchesne. The prepolymers therein described are hydroxy telechelic polybutadienes, particularly hydroxy-terminated polybutadienes which are desirably rich in cis isomer. They are obtained by the reaction of a mono-epoxy compound and the corresponding carboxy polymers. The product is a polymer having hydroxyl groups including primary and secondary such groups attached adjacent the ends of the polymer molecule, and preferably at the ends of the molecule. The mono-epoxy compound is an organic compound containing a single epoxy group including mono-epoxy resin; particularly preferred are epoxy compounds of the formula:

wherein each of R and R' is hydrogen, aryl, or an alkyl preferably lower alkyl group, and more particularly 1,2-alkylene oxides such as propylene oxide and 1,2-butylene oxide which produce secondary hydroxyl groups when reacted with the carboxyl telechelic polymer. The carboxy-terminated polybutadienes are suitably those supplied under the trade mark HC 434 by Thiokol Chemical Corporation and under the trade mark HYCAR-CTB by B. F. Goodrich and Company. A typical hydroxy-terminated polybutadiene prepolymer has a molecular weight of about 3200 and is believed to have the following formula:

wherein $x = 1-75$ for cis and trans butadienes and $y = 0-30$ for vinyl, but $y/x$ should be between 0 and 0.4.

Up to now, a preferred HTPB prepolymer is that sold under the trade mark Poly bd R-45M by Arco Chemicals Co. and has the following formula:

wherein $n = 44-60$ and the polybutadiene structure is 60% trans-1,4, 20% cis-1,4, and 20% vinyl-1,2.

Over the last six or seven years, R-45M prepolymer has been widely accepted as the best polymer for most of the hydroxyl-terminated polybutadiene (HTPB) propellants presently in use or in development in many countries. Despite this preference for R-45M by the propellant industry, composite propellants accounted for only a small portion of the total demand for R-45M. Recently, major consumers of this product in other industries shifted to a related prepolymer sold under the trade mark R-45HT, also by Arco. As a result, the price of R-45M is now more than double that of R-45HT. Because most propellant compositions comprise less than 10 percent prepolymer, the net effect on the total cost of the propellant is relatively low. It was therefore difficult to justify a shift to another prepolymer e.g. R-45HT on cost considerations alone. However, the possibility that R-45M will become difficult to procure in the future due to a very reduced market spurred on applicant's efforts. In view of the similar structure of R-45M and R-45HT, it was decided to experiment with the latter as a possible alternative.

If R-45HT was to be employed instead of R-45M, a further problem was to find a substitute for N-phenyl-beta-naphtylamine (PBNA), the antioxidant normally used in HTPB propellants based on R-45M. Moreover, within a few years PBNA will probably disappear from the market because it has been identified as a carcinogenic material and a possible danger to human health.

R-45HT has the same formula as R-45M above, the difference being in the value of "n" which in the case of R-45HT is 57-65. Other differences and similarities will be apparent from the following table.

TABLE 1

| | R-45M | R-45HT |
|---|---|---|
| Typical Functionality | 2.1–2.3 | 2.6–2.9 |
| OH (m. equiv./g) | 0.75 | 0.83 |
| Typical Equivalent Weight | 1320 | 1200 |
| Viscosity (poises) at 30° C. | 50 | 50 |
| Moisture (%/w) | 0.05 | 0.05 |

The HTPB prepolymer is used as the major ingredient in the propellant binder system, suitably in an amount of about 50–85 wt. %, preferably in an amount of about 60–65 wt. % of the binder composition. Suitably, an antioxident is utilized with the prepolymer and may be for example the phenyl-beta-naphthylamine (PBNA), the bisphenol AO-2246 (American Cyanamid) or various compounds having the chemical group p-phenylenediamine. The preferred antioxidant when using R-45M is phenyl-beta-naphthylamine in a concentration of about 1 percent by weight of the prepolymer.

When using R-45HT as the HTPB prepolymer, an antioxidant consisting of one or more of the following substances may be used:

TABLE II

| Tradename | Supplier | Chemical Name |
|---|---|---|
| PBNA | Uniroyal | Phenyl-beta-naphthylamine |
| A02246 | Cyanamid | Hindered bis-phenol |
| NAUGARDQ | Uniroyal | Polymerized trimethyl dihydroquinoline |
| OCTAMINE | Uniroyal | Diphenylamine-diisobutylene reaction product |
| FLEXZONE 7L | Uniroyal | N—phenyl, N'—(1,3 dimethyl-butyl)-p-phenylene diamine |
| FLEXZONE 6H | Uniroyal | N—phenyl, N'—cyclohexyl-p-phenylene diamine |
| UOP-36 | Universal Oil Products | N—phenyl, N'cyclohexyl-p-phenylene diamine |
| DTBHQ | Eastman | Di-tert-butylhydroquinone |

A synergistic effect on the pot lifes of mixes was obtained when a combination of DTBHQ with UOP-36 or FLEXZONE 7L was added to the propellant mix to the extent of 1 percent of the prepolymer.

The diisocyanate curing agent for use in the binder composition according to the present invention is for example 2,4-toluene diisocyanate (TDI), 1,6-hexamethylene diisocyanate (HMDI), or DDI which is a mixture of isomers of diisocyanate containing 36 carbon atoms prepared by dimerization of 18 carbon fatty acids. The preferred diisocyanate is DDI for the purposes of the present propellant binder systems. The isocyanate/hydroxyl (NCO/OH) ratio is adjusted to optimize the mechanical properties of the resulting propellant as recognized with previous systems. For the present purposes a typical NCO/OH equivalent ratio is in the range of 0.65–0.95.

In order to facilitate mixing of the binder composition with the solid oxidizer in preparing the castable propellants of the invention, a plasticizer is suitably included in the binder composition in a proportion of about 15 to 30 percent based on total weight of the binder composition. Compounds suitable as plasticizers are well known in the polymer art, and in the present composition may be for example dioctyl adipate (DOA), diethyl hexyl azelate (DEHA), or isodecyl pelargonate (IDP). However, the preferred plasticizer is IDP.

The aziridine polyester component of the bonding agent system is, as indicated, the reaction product of an aziridinyl phosphine oxide with a polycarboxylic acid. These materials are disclosed in for example U.S. Pat. Nos. 3,745,074 and 3,762,972. More specifically, they are the reaction products of di- or tri-functional aziridinyl phosphine oxide or its derivatives with organic molecules which are polyfunctional with respect to carboxyl groups and which may contain one or more hydroxyl groups in their structures. The reactants are:

where $X_1$ represents an aziridine group of the structure and $Q_1$ and $Q_2$ are either hydrogen or alkyl groups of one to four carbon atoms ($Q_1$ and $Q_2$ may be the same or different), $X_2$ may be the same as $X_1$ or may be an organic radical such as phenyl, benzyl, methyl, ethyl, etc., R is an alkyl that contains at least one active hydrogen atom or an organic entity of molecules that contain one or more hydroxyl groups, and n is 2, 3, or 4. The reaction product is a mixture of compounds, the nominal structure of which may be represented by:

wherein $X_1$, $X_2$, $Q_1$, $Q_2$, R and n are as already defined.

The optimum proportions are such that essentially all carboxyl groups in (II) are reacted and nominally one aziridine group in (I) is reacted, i.e., one mole of (I) for each carboxyl equivalent of (II).

The preferred aziridine polyester materials for use according to the present invention are prepared from tris-1-(2-methyl aziridinyl)phosphine oxide which is commonly known as MAPO and diacids such as adipic acid, malic acid, sebacic acid, succinic acid, and tartaric acid.

PAZ is a condensation product of MAPO, tris(2-methyl aziridimyl-1)phosphine oxide with a straight chain diacid of general formula $HOOC(CH_2)_xCOOH$ (x being 2 to 8 and preferably 4, 5 or 6) and a second substituted diacid of general formula $HOOCCH(R)(CH_2)_yCH(R_1)COOH$ in which R and $R_1$ can be similar or different being H or OH and $y=0$ to 6 being preferably 0, 1 or 2. In a typical synthesis, 3 to 8 moles of MAPO, and preferably 5 to 6 moles, are condensed with 0.5 to 1.0 mole of the substituted diacid and 1.75 to 2.5 moles of the straight chain diacid at 50° to 65° C. for 4 hrs. under $N_2$.

The proportion of the aziridine polyester bonding agent in the binder system according to the present invention is between about 0.1 and 1% by weight of total binder composition.

The other component of the bonding agent combination used in binders according to the present invention is the amine polyester material which is as indicated the reaction product of an alkanolamine and a saturated aliphatic polycarboxylic acid. The preferred amine polyester for the present purposes is a polymer derived from N-methyldiethanolamine and sebacic acid which is known as Polymer N-8. Suitable N-8 Polymers have the following specifications:

Mn (number average Mw): 1200-2000; preferred 1500-1800 acidity: <0.02 eq./100 g equivalent OH: 1-1.5 meq./g; preferred 1.1-1.3 humidity: 0.15% wt.

Other suitable agents have the following formulas wherein R" and R'$^v$ can be the same or different and can be an hydrogen or a saturated alkyl chain having one or two carbon atoms; R'" can be a saturated alkyl chain with one to eighteen carbon atoms; n is an integer from 2 to 16, the preferred one being 8; and $\sigma$ is an integer between 3-10, the preferred ones being 5-7. This bonding agent is used in an amount of about 0.1 to 0.3% by weight of the total binder composition.

To form the castable propellant according to the present invention the binder before curing is admixed according to a preferred process which will be described in detail herein, with finely divided ammonium perchlorate as oxidizer in dimodal or trimodal distributions of fine powders with average sizes of 1-400 μm. A preferred particle size distribution of the ammonium perchlorate is 1.7/2.7/1.0 parts of 400 μm size, 200 μm size, and 17 μm size respectively. For high temperature applications the ammonium perchlorate may be substituted by potassium perchlorate. Suitably an anticaking agent, e.g. tricalcium phosphate, is included in an amount of about 1% by weight of the 17 μm perchlorae. A metallic additive may be included in the propellant composition if desired in a concentration of 0 to 20% by weight of the total propellant. This additive may be finely divided aluminum or magnesium powder, preferably having an average particle size of 5-50 μm. Another solid material suitably included in the over-all composition is a burning rate additive or catalyst which may be for example iron oxide, copper chromite, or an organometallic compound. The preferred additive or catalyst for the present purposes is ferric oxide in an amount of 0.1-1% by weight of propellant composition.

In composite propellant compositions it is of course desirable to obtain as high solid loading as possible, and with the propellant compositions according to the present invention the total solids content can vary between about 85 to 90% by weight of total composition, of which of course the ammonium perchlorate will constitute the major part and may be between 68 and 88% by weight of total propellant composition. The other solid components are adjusted accordingly therein. Thus, the polymeric binder will constitute about 10 to 15% by weight of the total propellant composition.

In order to obtain good dispersion of all the ingredients in preparation of the propellant composition and also reproducibility of properties from one batch to another, the preferred procedure is to first add to a mixer the liquid ingredients which are the prepolymer, the plasticizer, and the two bonding agents. The aluminum or other metal powder when used and the ferric oxide burning rate additive are then added and the contents mixed for 15 minutes at atmospheric pressure. Then approximately three quarters of the total amount of ammonium perchlorate is added to the mixture and mixing continued for a further 10 minutes. Vacuum is applied and the contents of the mixer heated to 60° C. for about 60 minutes. The vacuum is then released and the remaining amount of ammonium perchlorate added and mixing continued for a further 5 minutes at atmospheric pressure. The diisocyanate curing agent is then added to the other ingredients in the mixture and mixing continued for 5 minutes at atmospheric pressure. After this vacuum is again applied and mixing continued for 45 minutes at a temperature of 60° C. The propellant is then cast into molds under vacuum.

Certain compositions may be difficult to process. If this problem occurs, the diisocyanate curing agent may be added and admixed prior to addition of the remaining ammonium perchlorate oxidizer.

In drawings which illustrate embodiments of the invention.

The following examples illustrate the use of the binder system according to the present invention in preparing composite solid propellants. The examples are intended to be illustrative of the present invention but are not to be taken as limiting to the scope thereof. The propellant compositions set out in the examples were each prepared according to the method described in the paragraph bridging pages 10 and 11.

The mechanical properties tested for the propellant compostions according to the present invention were tensile strength ($\sigma_m$), elongation at maximum load ($\epsilon_m$), elongation at rupture ($\epsilon_r$), and initial moduli (E). These tests were carried out on an Instron apparatus at a cross-head speed of 2 in./min. corresponding to a strain rate of 0.741 min.$^{-1}$ for the ICRPG "dumbell" specimen.

Propellant compositions were prepared having the following proportions of ingredients expressed in weight percent:

| | | |
|---|---|---|
| 1.7 parts | Ammonium perchlorate average diameter (400 μm) | } 69.4 |
| 2.7 parts | Ammonium perchlorate average diameter (200 μm) | |
| 1.0 parts | Ammonium perchlorate average diameter (17 μm) | |
| | Aluminum (spheroidal grade average diameter (22 μm) | } 18.0 |
| | Ferric Oxide Catalyst average diameter (1 μm) | } 0.6 |
| | HTPB Binder | } 12.0 |

For testing four binder compositions were used in the foregoing propellant composition. Binders I, II and III contained R-45M prepolymer including 1% PBNA and binder IV contained R-45HT including 1% of an equimixture of DTBHQ and FLEXZONE 6H. Isodecyl pelargonate was included as plasticizer, and DDI diisocyanate as curing agent. In one binder composition the two bonding agents according to the invention were not utilized but rather only the aziridine polyester for comparative purposes. In the other three compositions both bonding agents were included.

The binder compositions were as follows:

| | I | II | III | IV |
|---|---|---|---|---|
| Prepolymer (including 1% antioxidant) | 62.91 | 62.91 | 62.91 | 62.66 |
| DDI | 12.09 | 12.09 | 12.09 | 12.34 |
| Aziridine polyester | 2.40 | 0.9 | 0.6 | 0.8 |
| Amine polyester (N-8) | — | 0.2 | 0.2 | 0.2 |
| IDP plasticizer | 22.60 | 23.9 | 24.2 | 24.0 |

The aziridine polyester of this example was prepared by reacting 0.15 mole of d-tartaric acid and 0.3 mole of adipic acid with 1 mole of MAPO (aziridine) in the process previously described herein. The amine polyester (N-8) of this example had the following properties:

| | |
|---|---|
| (i) OH equivalent | 1.19 M equiv./g. |
| (ii) Acidity | 0.016 equiv./100 g. |
| (iii) Molecular weight (Mn) | 1430 determined by VPO. |

The processing and mechanical properties obtained for the propellant compositions using the aforementioned binders were:

| | I | II | III | IV |
|---|---|---|---|---|
| Aziridine/amine polyester (% in binder) | 2.4/— | 0.9/0.2 | 0.6/0.2 | 0.8/0.2 |
| End-of-mix viscosity (kP/60° C.) | 2.5 | 2.7 | 2.7 | 3.6 |
| Pot life to 10 kP (hr) | 4.2 | 4.2 | 4.5 | 6.6 |
| Mechanical Properties (initial) | | | | |
| $\sigma_m$ at 22.8° C. (MN/m$^2$) | .58 | .79 | .63 | .65 |
| $\xi_m$ at 22.8° C. (%) | 30.6 | 36.9 | 41.6 | 32.5 |
| E at 22.8° C. (MN/m$^2$) | 3.41 | 4.04 | 3.24 | 3.66 |
| $\xi_m$ at −45.6° C. (%) | 48.2 | 58.8 | 65.6 | 50.8 |
| $\xi_r$ at −45.6° C. (%) | 54.5 | 59.8 | 68.5 | 55.6 |
| Mechanical Properties (56 days at 60° C.) | | | | |
| $\sigma_m$ at 22.8° C. (MN/m$^2$) | .58 | .79 | .73 | .81 |
| $\xi_m$ at 22.8° C. (%) | 35.2 | 35.9 | 39.1 | 25.0 |
| E at 22.8° C. (MN/m$^2$) | 3.37 | 4.82 | 3.85 | 5.45 |
| $\xi_m$ at −45.6° C. (%) | 49.4 | 48.9 | 59.5 | 38.1 |

| -continued | | | | |
|---|---|---|---|---|
| | I | II | III | IV |
| $\xi_r$ at −45.6° C. (%) | 50.7 | 50.4 | 60.9 | 40.0 |

It will be seen from the foregoing results that the processing characteristics, that is end-of-mix viscosity and pot life, for the propellants according to the present invention (II, III and IV) were substantially the same as these properties for the reference propellant. However, the amount of aziridine polyester utilized according to the invention is considerably less than that required for the reference composition. Also, the propellants according to the invention show improved elongations at maximum load and at rupture while the tensile strength and initial moduli are comparable to the reference composition.

The following additional examples serve to emphasize the advantages of using R-45HT in combination with various novel binder systems.

PREPARATION OF R-45HT/ANTIOXIDANT BATCHES

Due to marked differences in the pot lives of propellants based on two lots of R-45HT, it has been decided to discuss the results for each lot separately.

Premixes of R-45HT (99 percent) and antioxidant (1.0 percent) were prepared by heating and agitating the components at 60° C. during approximately one hour. Because di-tert-butylhydroquinone (DTBHQ) is not soluble in R-45HT in excess of 0.2 percent, but is soluble in IDP plasticizer, premixes of R-45HT/IDP/DTBHQ were prepared with the following composition: R-45HT at 75.0 percent, IDP at 24.25 percent and DTBHQ at 0.75 percent. The relative concentration of DTBHQ with R-45HT was thus maintained at 1.0 percent. Unless otherwise stated, all the antioxidants were tested at a concentration of one percent of the prepolymer.

PROPELLANT MIXING AND CASTING

Propellant batches were manufactured in a Cone-Vertical 8-CV mixer operating at a batch size of 6.5 kg (approximately 50 percent of the mixer capacity). The same mixing and casting procedure was followed during the whole program. The liquid ingredients (the prepolymer including the antioxidant, the plasticizer and the two bonding agents) were first added to the mixer. The aluminum and the ferric oxide were then added and the content mixed for 15 minutes at atmospheric pressure with the jacket temperature maintained at 60° C. Then approximately three quarters of the total amount of ammonium perchlorate was added to the mixture and mixing continued for a further 10 minutes. Vacuum was applied and the contents of the mixer heated to 60° C. for 60 minutes. The vacuum was released and the remaining amount of ammonium perchlorate added and mixing continued for a further 5 minutes at atmospheric pressure. The diisocyanate curing agent was added to the other ingredients in the mixer and mixing continued for 5 minutes at atmospheric pressure. After this vacuum was again applied and mixing continued for 45 minutes at a temperature of 60° C. The propellant was then cast into molds under vacuum.

VISCOSITY AND POT LIFE MEASUREMENTS

The end-of-mix (EOM) viscosities were obtained with a Brookfield apparatus Model HAT mounted on a Helipath stand. All the measurements were made with a spindle type D at a rotational speed of 2.5 rpm and at a nominal casting temperature of 60° C. Pot life data was taken with Rotovisko apparatus (Gebruder Haake, Berlin) coupled with special controls for continuous recording of the torque and automatic retracting of the viscometer probe. The pot life is defined here as the period between the initial addition of the polymerizing agent (DDI) and the time required for the viscosity to reach 10 kilopoises (kP) at 60° C.

MEASUREMENTS OF MECHANICAL PROPERTIES AND DATA REDUCTION

Mechanical properties were measured after curing and after accelerated aging in circulating air at 60° C. Enough propellant was cast (usually a 15×15×13-cm block) for full evaluation at −53.9°, −45.6° and 22.8° C. After a normal curing period of five days at 60° C., the block was X-rayed and cut into slabs 1.27 cm±0.05 thick; ICRPG dogbones were die-cut and measurements taken of the minimum section. Four samples were tested on the Instron tester at an extention rate of 0.0847 cm/s at each of the three temperatures. For accelerated aging tests, the machines slabs of propellant were individually wrapped in polyethylene bags.

RESULTS AND DISCUSSION

Propellants Based on R-45HT Lot 403245

Effect of Polymer Type on Pot Life

Figure 1:
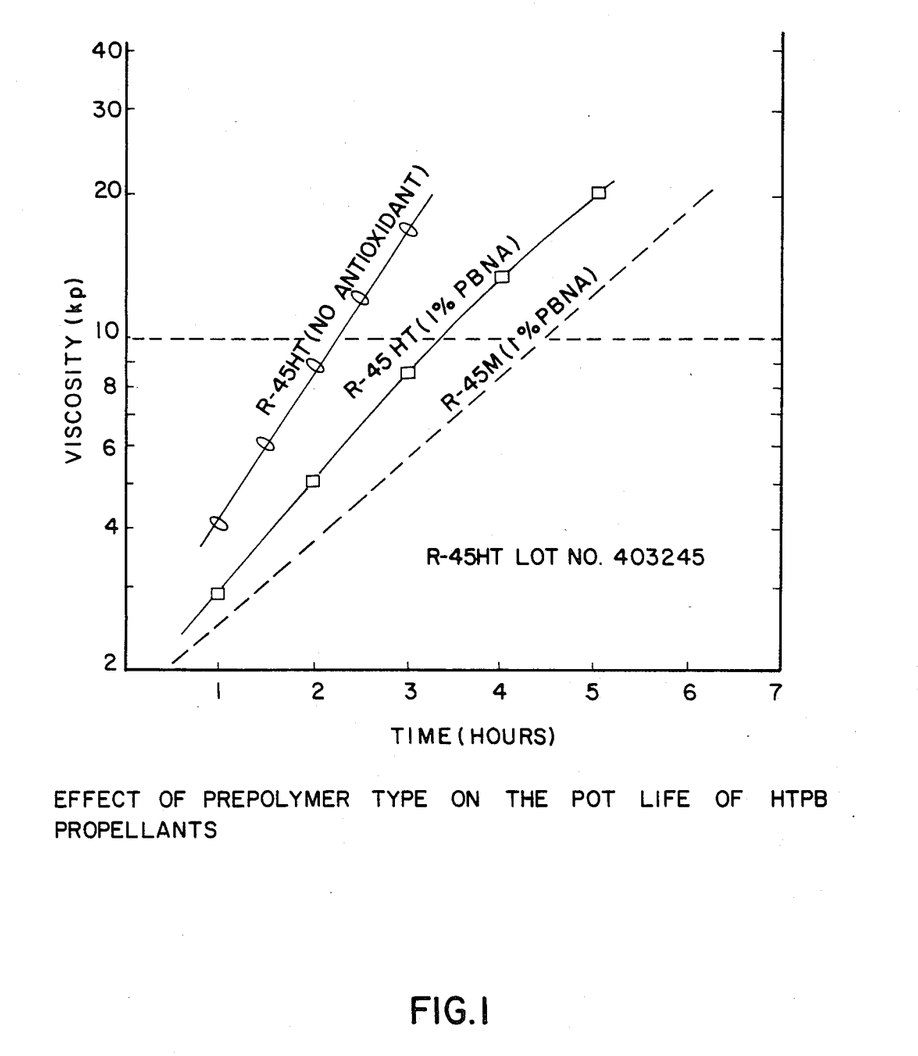
FIG. 1 is a graph of the effect of prepolymer type on the pot life of HTPB propellants.

The two lower curves of FIG. 1 illustrate the effect of the prepolymer (R-45M versus R-45HT) on the propellant viscosity variation with the time elapsed after addition of DDI curative agent. With PBNA as the reference antioxidant, the pot lives (to attain a viscosity of 10 kP) are 4.5 and 3.3 hours respectively for R-45M and R-45HT.

Effect of the Antioxidants on Pot Life

The two upper curves of FIG. 1 show the beneficial effect of PBNA antioxidant on the pot life of a typical HTPB/R-45HT propellant. Without antioxidant, the R-45HT propellants would show a pot life of only 2.3 hours. It is therefore important to select an antioxidant which also slows down the initial polymerization rate of the propellant. Each of the three propellants of FIG. 1 had two bonding agents at a concentration of PAZ/PAM of 0.6/0.2 percent of the binder.

Figure 2:
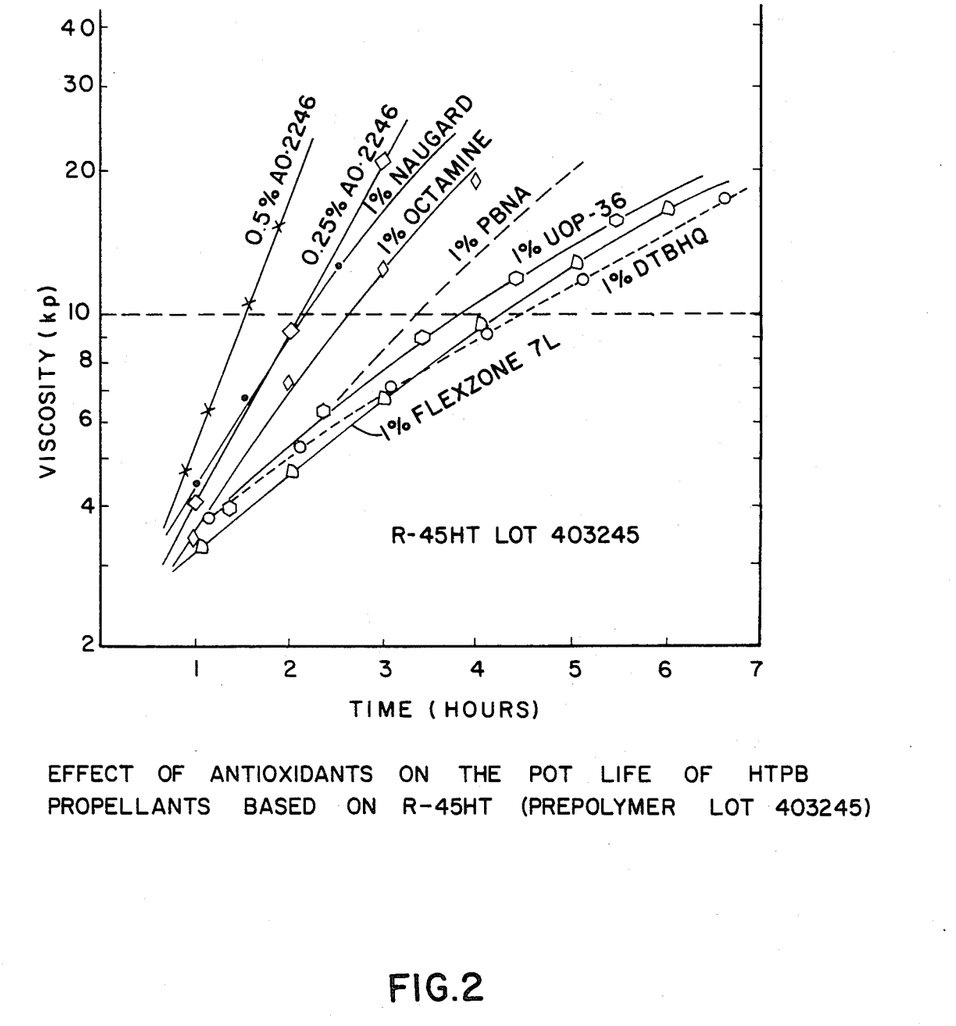
FIG. 2 is a graph of the effect of antioxidants on the pot life of HTPB propellants based on R-45HT (prepolymer lot 403245)

Six of the seven antioxidants listed in Table II (excluding FLEXZONE 6H) were tested separately in a similar propellant based on R-45HT lot No. 403245. Three antioxidants yielded a pot life shorter than R-45HT/PBNA propellant; they are, as shown on FIG. 2, AO-2246, NAUGARDQ Q and OCTAMINE. AO-2246 was the worst one with pot lives of 1.5 and 2.1 hours at concentrations of 0.5 and 0.25 percent in the prepolymer. The three other antioxidants yielded pot lives longer than R-45HT/PBNA propellant (UOP-36 at 3.6 hours, FLEXZONE 7L at 4.2 hours and DTBHQ at 4.4 hours).

Effect of Combinations of Antioxidants on Pot Life

A synergistic effect was observed (Table III) when a combination of DTBHQ with UOP-36 or FLEXZONE 7L was added to the propellant mix to the extent of 1 percent of the prepolymer. Effectively, the pot life of the DTBHQ/UOP-36/R-45HT and DTBHQ/FLEXZONE 7L/R-45HT propellants were longer than those observed on DTBHQ/R-45HT, UOP-36/R-45HT and FLEXZONE/R-45HT propellants.

Twelve of the 15 mixes prepared with combinations of DTBHQ and UOP-36 or FLEXZONE 7L yielded pot lives longer than 4.5 hours. On the average, pot lives of DTBHQ/UOP-36 propellants were 4.9 hours and those of DTBHQ/FLEXZONE 7L propellants were 4.5 hours.

TABLE III

Effect of Combinations of Antioxidants On Pot Life of R-45HT Propellants

| Combinations of Antioxidants | | | |
|---|---|---|---|
| DTBHQ | UOP-36 | FLEXZONE 7L | Pot Life at 10 kP Viscosity (hr) |
| 100 | — | — | 4.4 |
| 75 | 25 | — | 5.0, 5.6, 4.8, 4.1 |
| 50 | 50 | — | 5.2, 5.1, 4.9 |
| 25 | 75 | — | 4.6 |
| — | 100 | — | 3.8 |
| 50 | — | 50 | 4.3 |
| 25 | — | 75 | 4.5, 4.8, 4.2, 4.6, 4.5, 5.0 |
| — | — | 100 | 4.1 |

Underlined results were obtained with PAZ/R-45HT formulations.

Screening of Antioxidants

Based upon the data presented above the pot lives of R-45HT propellants appear to be strongly dependent upon the type of antioxidant added to the composition. To reduce the scope of the program, it was decided that the three antioxidants yielding a shorter pot life than R-45HT/PBNA propellant (AO-2246, NAUGARD Q and OCTAMINE) would be dropped from this study. On the other hand, accelerated aging tests at 60° C., would be carried out on propellants containing one or two of three other candidates UOP-36, FLEXZONE 7L and DTBHQ) to evaluate their effectiveness as an antioxidant.

Mechanical Property Data

Eleven propellant mixes based on R-45HT Lot 403245 were tested for mechanical properties; their binder compositions are shown in Table IV. The solids composition is as described previously. A reference propellant (mix 29) was formulated without antioxidant. Four mixes had a single antioxidant: mix 26 (FLEXZONE 7L), mix 28 (UOP-36), mixes 25 and 35 (DTBHQ). Their mechanical properties after curing (t=0) and upon aging (14, 28 and 56 days at 60° C.) are shown in Table V. The mechanical properties of six propellant mixes incorporating two antioxidants (UOP-36/DTBHQ or FLEXZONE 7L/DTBHQ are listed in Table VI.

TABLE IV

Binder Compositions based on R-45HT Lot 403245

| Mix No. | Antioxidant Type | | NCO/OH Ratio | Composition (% Wt) | | | | |
|---|---|---|---|---|---|---|---|---|
| | | | | R-45HT | DDI | IDP | PAZ | PAM |
| 29 | nil | | 0.85 | 62.03 | 12.97 | 24.20 | 0.6 | 0.2 |
| 26 | FLEX.7L | | 0.875 | 61.72 | 13.28 | 24.00 | 0.8 | 0.2 |
| 28 | UOP-36 | | 0.85 | 62.03 | 12.97 | 24.20 | 0.6 | 0.2 |
| 25 | DTBHQ | | 0.85 | 62.03 | 12.97 | 24.20 | 0.6 | 0.2 |
| 35 | DTBHQ | | 0.85 | 62.03 | 12.97 | 24.20 | 0.6 | 0.2 |
| 07 | 75 | DTBHQ | 0.85 | 62.03 | 12.97 | 24.20 | 0.6 | 0.2 |
| | 25 | UOP-36 | | | | | | |
| 08 | 75 | DTBHQ | 0.85 | 62.03 | 12.97 | 22.60 | 2.4 | 0.0 |
| | 25 | UOP-36 | | | | | | |
| 09 | 25 | DTBHQ | 0.875 | 61.72 | 13.28 | 24.20 | 0.6 | 0.2 |
| | 75 | Flex-7L | | | | | | |
| 16 | 25 | DTBHQ | 0.85 | 62.03 | 12.97 | 22.60 | 2.4 | 0.0 |
| | 75 | Flex-7L | | | | | | |
| 17 | 25 | DTBHQ | 0.85 | 62.03 | 12.97 | 22.60 | 2.4 | 0.0 |
| | 75 | Flex-7L | | | | | | |
| 18 | 25 | DTBHQ | 0.85 | 62.03 | 12.97 | 22.60 | 2.4 | 0.0 |
| | 75 | Flex-7L | | | | | | |

TABLE V

Mechanical Property Data For Three Antioxidants (R-45HT, Lot 403245)

| Properties | | at Temp. (°C.) | Aging (Day) | Mixes | | | | |
|---|---|---|---|---|---|---|---|---|
| | | | | 29 | 26 | 28 | 25 | 35 |
| $\sigma_m$ | (kPa) | 22.8 | 0 | 703 | 590 | 406 | 681 | 746 |
| $\xi_m$ | (%) | " | " | 16.5 | 34.7 | 37.8 | 30.5 | 31.7 |
| E | (kPa) | " | " | 6784 | 2906 | 1981 | 4153 | 4677 |
| $\xi_m$ | (%) | −45.6 | " | 18.9 | 48.1 | 56.8 | 43.9 | 46.9 |
| $\xi_r$ | (%) | " | " | 20.7 | 52.0 | 65.9 | 50.2 | 51.1 |
| $\xi_m$ | (%) | −53.9 | " | 15.1 | 42.8 | 43.9 | 33.1 | 39.5 |
| $\xi_r$ | (%) | " | " | 17.1 | 47.7 | 47.1 | 41.1 | 43.7 |
| $\sigma_m$ | (kPa) | 22.8 | 14 | 738 | 662 | 479 | 759 | 795 |
| $\xi_m$ | (%) | " | " | 9.1 | 31.0 | 34.2 | 33.9 | 29.8 |
| E | (kPa) | " | " | 10790 | 4259 | 2565 | 4871 | 5034 |
| $\sigma_m$ | (kPa) | 22.8 | 28 | 492 | 680 | 565 | 769 | 861 |
| $\xi_m$ | (%) | " | " | 3.4 | 31.5 | 33.8 | 27.6 | 26.7 |
| E | (kPa) | " | " | 18612 | 4049 | 3218 | 5444 | 5870 |
| $\xi_m$ | (%) | −45.6 | " | 6.2 | 57.7 | 50.2 | 52.5 | 41.9 |
| $\xi_m$ | (%) | " | " | 6.4 | 61.0 | 53.8 | 55.6 | 43.7 |

TABLE V-continued

Mechanical Property Data For Three Antioxidants
(R-45HT, Lot 403245)

| Properties | | at Temp. (°C.) | Aging (Day) | Mixes | | | | |
|---|---|---|---|---|---|---|---|---|
| | | | | 29 | 26 | 28 | 25 | 35 |
| $\sigma_m$ | (kPa) | 22.8 | 56 | 438 | 782 | 648 | 857 | 904 |
| $\xi_m$ | (%) | " | " | 2.2 | 29.5 | 30.5 | 21.7 | 22.0 |
| E | (kPa) | 2 | " | 29582 | 4890 | 3656 | 7443 | 7423 |
| $\xi_m$ | (%) | −45.6 | " | 3.7 | 43.5 | 47.1 | 31.5 | 33.8 |
| $\xi_r$ | (%) | " | " | 3.8 | 45.8 | 48.6 | 35.1 | 37.1 |
| Antioxidant Type | | | | — | FLEX.7L | UOP-36 | DTBHQ | DTBHQ |

TABLE VI

Mechanical Property Data for Mixtures of Antioxidants
(R-45HT, Lot 403245)

| Properties | | at Temp. (°C.) | Aging (Day) | Mixes | | | | | |
|---|---|---|---|---|---|---|---|---|---|
| | | | | 07 | 08 | 09 | 16 | 17 | 18 |
| $\sigma_m$ | (kPa) | 22.8 | 0 | 622 | 848 | 483 | 611 | 743 | 835 |
| $\xi_m$ | (%) | " | " | 27.7 | 23.0 | 41.8 | 29.5 | 27.4 | 26.3 |
| E | (kPa) | " | " | 3158 | 5767 | 1439 | 3132 | 3778 | 4710 |
| $\xi_m$ | (%) | −45.6 | " | 33.2 | 37.0 | 55.7 | 40.9 | 39.3 | 38.1 |
| $\xi_r$ | (%) | " | " | 39.2 | 38.2 | 60.2 | 44.8 | 42.5 | 41.0 |
| $\xi_m$ | (%) | −53.9 | " | 22.8 | 32.0 | 27.0 | 36.3 | 37.4 | 35.2 |
| $\xi_r$ | (%) | " | " | 32.7 | 35.9 | 48.0 | 39.1 | 39.6 | 37.7 |
| $\sigma_m$ | (kPa) | " | " | 660 | 1083 | 554 | 813 | 946 | 953 |
| $\xi_m$ | (%) | " | " | 28.6 | 24.1 | 38.0 | 23.7 | 21.7 | 22.8 |
| E | (kPa) | " | " | 2659 | 6986 | 2431 | 4873 | 5933 | 6302 |
| $\sigma_m$ | (kPa) | 22.8 | 28 | 722 | 1060 | 594 | 836 | 9176 | 1043 |
| $\xi_m$ | (%) | " | " | 26.0 | 25.6 | 36.6 | 24.8 | 22.6 | 23.0 |
| E | (kPa) | " | " | 4500 | 6339 | 2467 | 5273 | 6575 | 6583 |
| $\xi_m$ | (%) | −45.6 | " | 32.0 | 36.5 | 48.6 | 36.7 | 34.0 | 35.1 |
| $\xi_r$ | (%) | " | " | 36.0 | 37.5 | 52.7 | 38.1 | 35.0 | 36.3 |
| $\sigma_m$ | (kPa) | 22.8 | 56 | 730 | 1001 | 608 | 927 | 1079 | 1031 |
| $\xi_m$ | (%) | " | " | 23.4 | 25.5 | 32.8 | 26.7 | 24.5 | 23.4 |
| E | (kPa) | " | " | 5371 | 7466 | 3492 | 6407 | 7760 | 7220 |
| $\xi_m$ | (%) | −45.6 | " | 30.7 | 35.8 | 46.4 | 37.0 | 33.8 | 35.5 |
| $\xi_r$ | (%) | " | " | 35.3 | 36.4 | 50.7 | 38.2 | 34.6 | 36.0 |
| DTHBQ (% of R-45HT) | | | | 0.75 | 0.75 | 0.25 | 0.25 | 0.25 | 0.25 |
| UOP-36 (% of R-45HT) | | | | 0.25 | 0.25 | — | — | — | — |
| FLEX.7L (% of R-45HT) | | | | — | — | 0.75 | 0.75 | 0.75 | 0.75 |

R-45HT Propellant Without Antioxidant

As expected, an unprotected R-45HT propellant looses its mechanical properties very rapidly upon aging; its stress and strain at room temperature fall from 703 kPa and 16.5% at t=0 to 438 kPa and 2.2% only after 56 days of aging at 60° C. Conversely, the modulus increases from 6784 to 29582 kPa. Obviously, an unprotected R-45HT propellant is very susceptible to oxidation.

Effectiveness of UOP-36, FLEXZONE 7L and DTBHQ

Results for mixes 26, 28, 25 and 35 (Table V) tend to indicate that each of the above three candidates provides efficient protection against oxidation. All four mixes however, show some degree of post-curing as evidenced by the increasing $\sigma_m$ and E upon aging.

Effectiveness of Mixtures of Antioxidants

It has been shown above that a combination of DTBHQ with UOP-36 or FLEXZONE 7L yielded improved pot lives. Aging results for mixes 07, 08, 09, 16, 17 and 18 (Table VI) indicate that the combinations of two antioxidants also provide efficient protection against oxidation. Good batch-to-batch reproducibility while aging at 60° C. was obtained with mixes 16, 17 and 18.

Propellants Based on R-45HT Lot 606095

Thirteen (13) propellant compositions based on R-45HT Lot 606095 were tested for processing characteristics and accelerated aging properties; their binder compositions are listed in Table VII. The main variables under study were: the type of antioxidant(s), the concentration of isocyanate/hydroxyl groups (NCO/OH) and the concentration of bonding agents. Two antioxidants were evaluated alone (DTBHQ and FLEXZONE 6H) and three combinations of DTBHQ with FLEXZONE 6H or FLEXZONE 7L were tested with the solids system described previously.

TABLE VII

Binder Compositions based on R-45HT Lot 606095

| Mix No. | Antioxidant Type (1) | NCO/OH Ratio | Compositions (% Wt) | | | | |
|---|---|---|---|---|---|---|---|
| | | | R-45HT | DDI | IDP | PAZ | PAM |
| 41 | DTBHQ | 0.80 | 62.03 | 12.97 | 24.2 | 0.6 | 0.2 |
| 47 | " | 0.80 | 61.98 | 13.02 | 24.0 | 0.8 | 0.2 |
| 64 | " | 0.725 | 63.01 | 11.99 | 24.0 | 0.8 | 0.2 |
| 71 | " | 0.70 | 63.36 | 11.64 | 24.0 | 0.8 | 0.2 |
| 72 | FLEX.6H | 0.75 | 62.66 | 12.34 | 24.0 | 0.8 | 0.2 |
| 60 | C | 0.75 | 62.66 | 12.34 | 24.0 | 0.8 | 0.2 |
| 66 | C | 0.725 | 63.01 | 11.99 | 24.0 | 0.8 | 0.2 |
| 73 | E | 0.75 | 62.66 | 12.34 | 24.0 | 0.8 | 0.2 |
| 65 | D | 0.725 | 63.01 | 11.99 | 24.0 | 0.8 | 0.2 |
| 61 | D | 0.75 | 62.66 | 12.34 | 24.0 | 0.8 | 0.2 |
| 68 | D | 0.75 | 62.66 | 12.34 | 24.4 | 0.4 | 0.2 |
| 69 | D | 0.75 | 62.66 | 12.34 | 23.6 | 1.2 | 0.2 |

TABLE VII-continued

Binder Compositions based on R-45HT Lot 606095

| Mix No. | Antioxidant Type (1) | NCO/OH Ratio | Compositions (% Wt) | | | | |
|---|---|---|---|---|---|---|---|
| | | | R-45HT | DDI | IDP | PAZ | PAM |
| 70 | D | 0.75 | 62.66 | 12.34 | 23.8 | 0.8 | 0.4 |

(1) Type C is a 50/50 mixture of DTBHQ/FLEXZONE 7L.
Type D is a 50/50 mixture of DTBHQ/FLEXONE 6H.
Type E is a 25/75 mixture of DTBHQ/FLEXZONE 6H.

Effect of Antioxidant on Processing Characteristics

Figure 3:
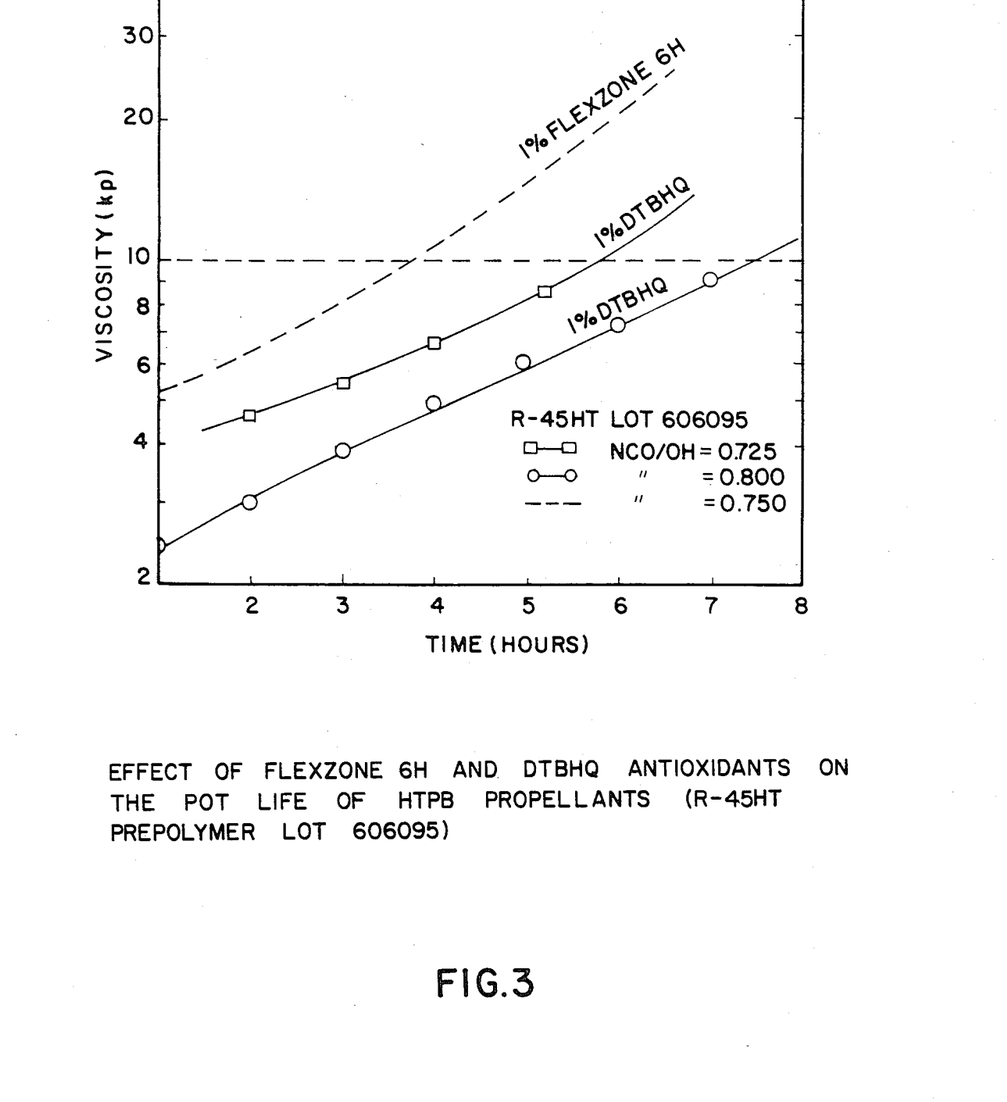
FIG. 3 is a graph of the effect of FLEXZONE 6H and DTBHQ antioxidants on the pot life of HTPB propellants (R-45HT prepolymer lot 606095)
Figure 4:
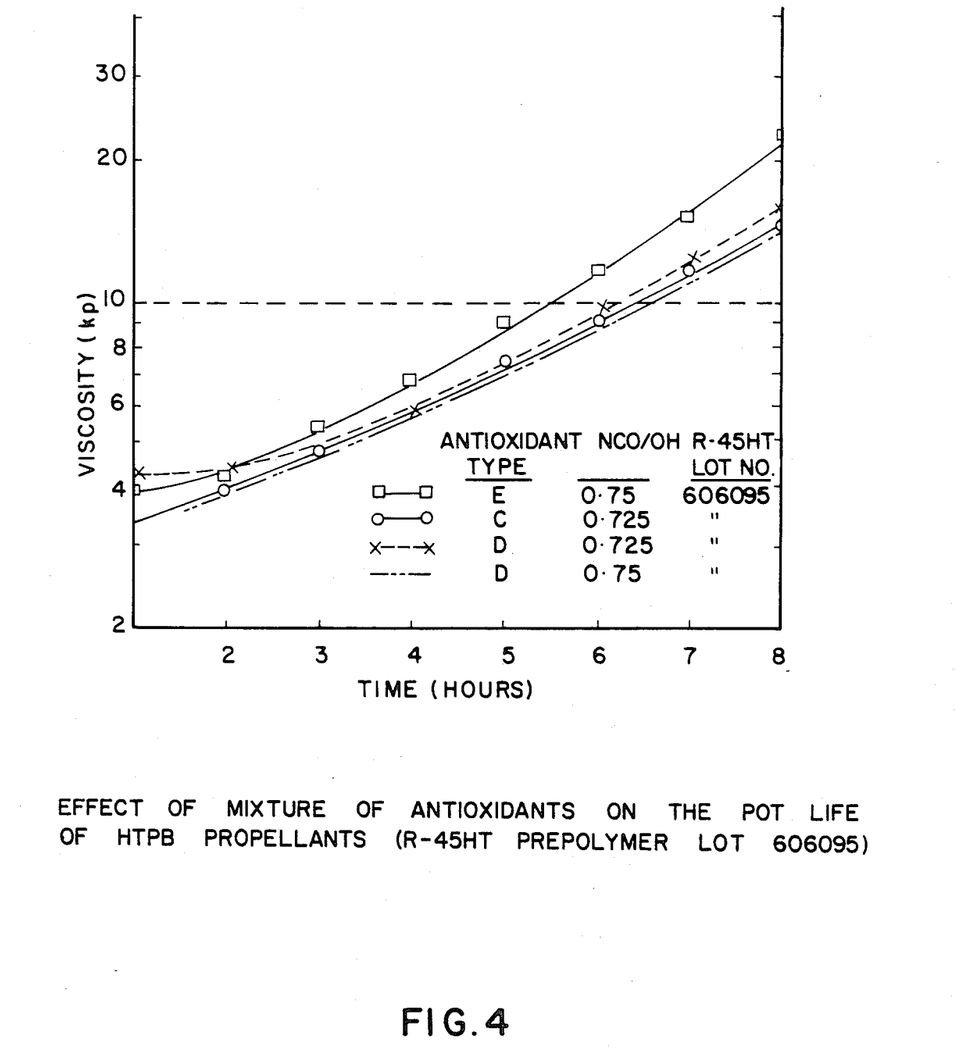
FIG. 4 is a graph of the effect of mixture of antioxidants on the pot life of HTPB propellants (R-45HT prepolymer lot 606095)
Figure 5:
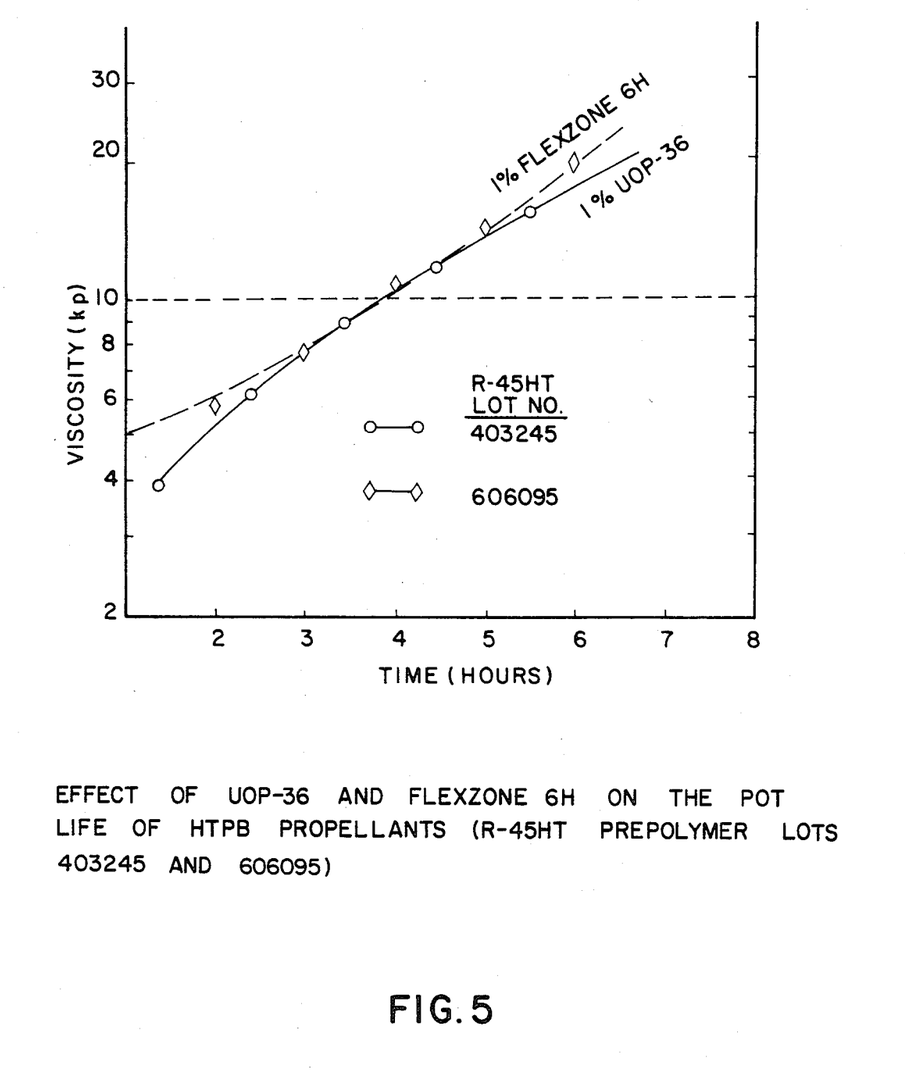
FIG. 5 is a graph of the effect of UOP-36 and FLEXZONE 6H on the pot life of HTPB propellants (R-45HT prepolymer lots 403245 and 606095)

As can be seen on Table VIII, very satisfactory EOM viscosities and pot lives were obtained with DTBHQ and combinations of DTBHQ with FLEXZONE 7L or FLEXZONE 6H. The pot lives of 12 of the 13 mixes were longer than 5.5 hours for a mix viscosity of 10 kP at 60° C. This is well above the target of 4.5 hours, as the average for 12 mixes is 6.6 hours. This is further illustrated in FIGS. 3 and 4. The propellant containing FLEXZONE 6H alone as antioxidant (Mix 72) displayed a pot life of 3.9 hours (FIG. 5); this compares advantageously with UOP-36, another commercial name for N-phenyl, N'-cyclohexyl-p-phenylene diamine.

TABLE VIII

Processing Characteristics of R-45HT Propellants Lot 606095

| Mix No | Antioxidant Types (1) | E.O.M. kP/°C. | Viscosity at 10 kP (60° C.) | Pot Lives (hr) at 20 kP (60° C.) |
|---|---|---|---|---|
| 41 | DTBHQ | 2.5/59 | 7.5 | 10.6 |
| 47 | " | 3.4/57 | 7.9 | 10.6 |
| 64 | " | 4.4/56 | 5.9 | — |
| 71 | " | 4.5/58 | 6.0 | 8.6 |
| 72 | FLEX.6H | 5.6/59 | 3.9 | 6.0 |
| 60 | C | 3.0/57 | 7.8 | 10.2 |
| 66 | C | 4.1/58 | 6.4 | 9.2 |
| 73 | E | 4.3/59 | 5.5 | 7.8 |
| 65 | D | 4.2/57 | 6.2 | 8.6 |
| 61 | D | 4.1/56 | 6.6 | 9.2 |
| 68 | D | 4.3/58 | 6.4 | 8.8 |
| 69 | D | 4.4/58 | 6.7 | 8.9 |
| 70 | D | 5.6/59 | 6.1 | 8.2 |

(1) Type C is a 50/50 mixture of DTBHQ/FLEXZONE 7L.
Type D is a 50/50 mixture of DTBHQ/FLEXZONE 6H.
Type E is a 25/75 mixture of DTBHQ/FLEXZONE 6H.

Effect of Antioxidants on Mechanical Properties

The mechanical properties at t=0 and upon aging at 60° C. for four propellant mixes (41, 47, 64 and 71) containing DTBHQ antioxidant are listed in Table IX. The optimized concentration NCO/OH appears to be 0.725, since $\sigma_m$, $\epsilon_m$ and E at 22.8° C. are respectively 686 kPa, 33.4% and 3742 kPa, and at −53.9° C., $\epsilon_m$ is as high as 45.8%. Again, the four mixes show some degree of post-curing. Results in Table X indicate that (i) the initial $\sigma_m$ at room temperature is too low for the FLEXZONE 6H/R-45HT propellant (mix 72); (ii) propellants containing combinations of DTBHQ with FLEXZONE 7L and FLEXZONE 6H have satisfactory aging properties; (iii) an NCO/OH ratio of 0.75 yields better propellant than 0.725 (cf. mixes 60 and 66).

TABLE IX

Mechanical Properties of R-45HT Propellants Lot 606095; DTHBQ Antioxidant

| Properties | | at Temp. (°C.) | Aging (Day) | Mixes | | | |
|---|---|---|---|---|---|---|---|
| | | | | 41 | 47 | 64 | 71 |
| $\sigma_m$ | (kPa) | 22.8 | 0 | 859 | 899 | 686 | 605 |
| $\xi_m$ | (%) | " | " | 26.4 | 20.1 | 33.4 | 34.9 |
| E | (kPa) | " | " | 5783 | 8096 | 3742 | 3117 |
| $\xi_m$ | (%) | −45.6 | " | 37.2 | 30.3 | 52.0 | 54.5 |
| $\xi_r$ | (%) | " | " | 41.7 | 33.3 | 58.1 | 56.7 |
| $\xi_m$ | (%) | −53.9 | " | 27.7 | 27.5 | 45.8 | 47.7 |
| $\xi_r$ | (%) | " | " | 33.6 | 30.3 | 48.9 | 50.6 |
| $\sigma_m$ | (kPa) | 22.8 | 14 | 895 | 959 | 746 | 693 |
| $\xi_m$ | (%) | " | " | 24.8 | 20.6 | 30.0 | 29.8 |
| E | (kpa) | " | " | 6587 | 8089 | 4424 | 4059 |
| $\sigma_m$ | (kPa) | 22.8 | 28 | 916 | 980 | 794 | 754 |
| $\xi_m$ | (%) | " | " | 24.0 | 21.0 | 29.8 | 29.6 |
| E | (kPa) | " | " | 6570 | 8259 | 4773 | 4463 |
| $\xi_m$ | (%) | −45.6 | " | 35.9 | 28.8 | 48.0 | 48.4 |
| $\xi_r$ | (%) | " | " | 40.1 | 31.8 | 50.5 | 51.1 |
| $\sigma_m$ | (kPa) | 22.8 | 56 | 873 | 996 | 811 | 799 |
| $\xi_m$ | (%) | " | " | 22.1 | 20.9 | 24.5 | 23.5 |
| E | (kPa) | " | " | 6402 | 9713 | 5626 | 5642 |
| $\xi_m$ | (%) | −45.6 | " | 27.7 | 22.9 | 38.3 | 32.3 |
| $\xi_m$ | (%) | " | " | 32.5 | 26.8 | 40.4 | 33.6 |
| R (NCO/OH ratio) | | | | 0.80 | 0.80 | 0.725 | 0.70 |

TABLE X

Mechanical Properties of R-45HT Propellants Lot 606095; FLEX.6H, Types C and E Antioxidants

| Properties | | at Temp. (°C.) | Aging (Day) | Mixes | | | |
|---|---|---|---|---|---|---|---|
| | | | | 72 | 60 | 66 | 73 |
| $\sigma_m$ | (kPa) | 22.8 | 0 | 483 | 674 | 499 | 584 |
| $\xi_m$ | (%) | " | " | 35.7 | 31.4 | 35.7 | 28.2 |
| E | (kPa) | " | " | 2461 | 3663 | 2641 | 3835 |
| $\xi_m$ | (%) | −45.6 | " | 49.8 | 47.8 | 50.9 | 49.9 |
| $\xi_r$ | (%) | " | " | 56.0 | 50.8 | 58.1 | 52.5 |
| $\xi_m$ | (%) | −53.9 | " | 44.0 | 42.8 | 45.9 | 45.4 |
| $\xi_r$ | (%) | " | " | 47.6 | 43.5 | 49.0 | 47.1 |
| $\sigma_m$ | (kPa) | 22.8 | 14 | 614 | 720 | 611 | 724 |
| $\xi_m$ | (%) | " | " | 29.9 | 30.6 | 31.3 | 28.7 |
| E | (kPa) | " | " | 3510 | 4207 | 3490 | 4517 |
| $\sigma_m$ | (kPa) | 22.8 | 28 | 654 | 793 | 671 | 814 |
| $\xi_m$ | (%) | " | " | 29.1 | 29.1 | 30.0 | 27.8 |
| E | (kPa) | " | " | 3725 | 4647 | 3819 | 5281 |
| $\xi_m$ | (%) | −45.6 | " | 49.6 | 43.4 | 49.9 | 45.2 |
| $\xi_r$ | (%) | " | " | 52.1 | 46.2 | 51.7 | 46.8 |
| $\sigma_m$ | (kPa) | 22.8 | 56 | 722 | 849 | 739 | 797 |
| $\xi_m$ | (%) | " | " | 26.8 | 26.6 | 28.5 | 23.9 |
| E | (kPa) | " | " | 4306 | 5526 | 4701 | 6142 |
| $\xi_m$ | (%) | −45.6 | " | 43.1 | 39.4 | 44.6 | 34.8 |
| $\xi_r$ | (%) | " | " | 44.7 | 40.5 | 46.7 | 37.3 |
| R NCO/OH ratio | | | | 0.75 | 0.75 | 0.725 | 0.75 |
| FLEX.6H (% of R-45HT) | | | | 1.00 | — | — | 0.75 |
| DTBHQ (% of 45HT) | | | | — | 0.50 | 0.50 | 0.25 |
| FLEX.7L (% of R-45HT) | | | | — | 0.50 | 0.50 | — |
| | | | | 0.50 | | | |

Optimization of Bonding Agents in Propellants Containing Type D Antioxidants Two propellants (mixes 65 and 61) containing the 50/50 mixture of DTBHQ/FLEXZONE 6H (type D antioxidants) performed very well with respect to pot lives (Table VIII) and mechanical properties (Table XI). Mix 61, in particular, having an NCO/OH ratio of 0.75 showed $\sigma_m$, $\epsilon_m$ and E of 6.50 kPa, 32.5% and 3657 kPa at room temperature and $\epsilon_m$ of 50.8 and 44.9% at −45.6° and −53.9° C. respectively. In most of the previous compositions, the concentration of PAZ/PAM bonding agents was kept at 0.8/0.2 percent of the binder. Three propellants having an NCO/OH of 0.75

Figure 6:
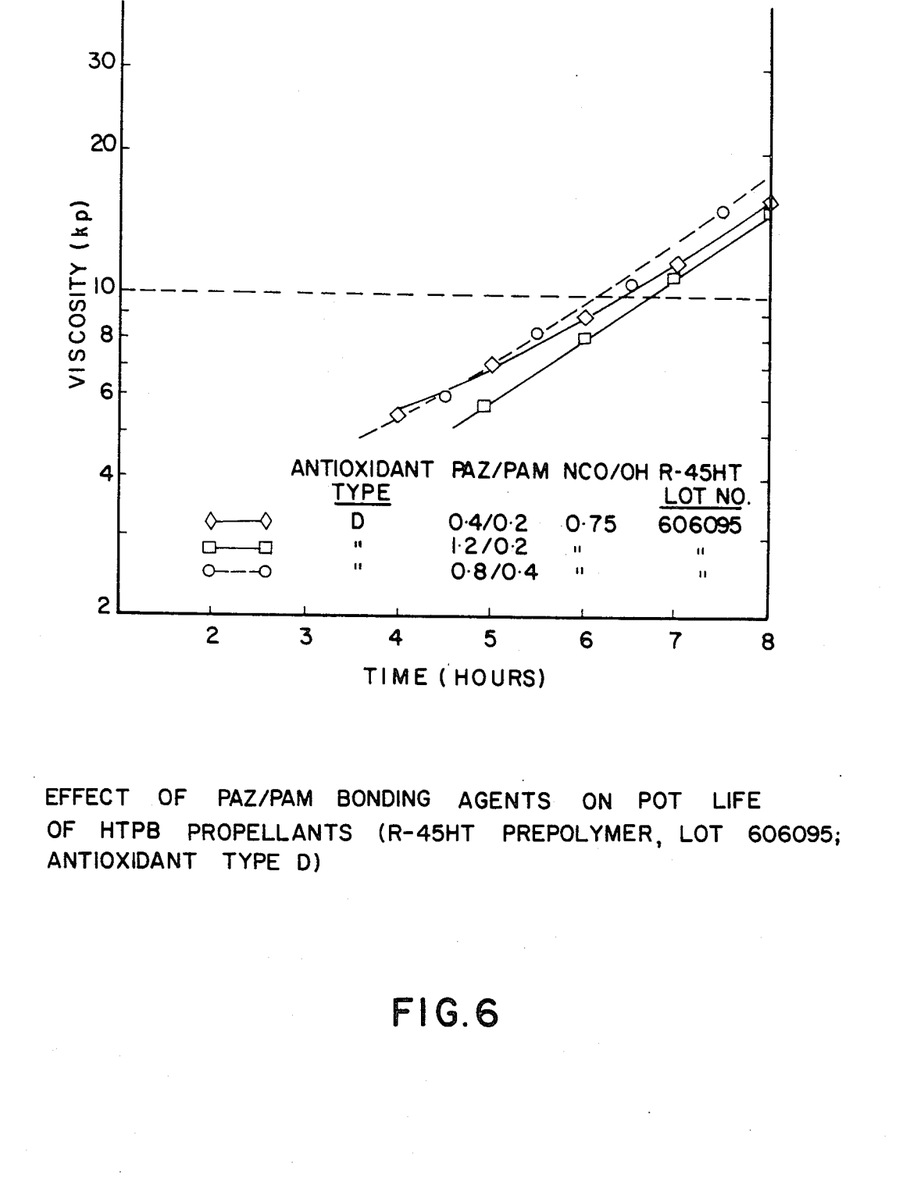
FIG. 6 is a graph of the effect of PAZ/PAM bonding agents on pot life of HTPB propellants (R-45HT prepolymer, lot 606095; antioxidant type D).

(mixes 68, 69 and 70) were formulated to verify the effect of changing the PAZ/PAM concentrations to 0.4/0.2, 1.2/0.2 and 0.8/0.4 percent. All the pot lives were longer than 6 hours (FIG. 6) and the mechanical properties were excellent. The preferred PAZ/PAM ratio is that of mix 70 (0.8/0.4) which yielded an $\epsilon_m$ of 45.8 percent at $-45.6°$ C. after 56 days of aging.

TABLE XI

Mechanical Properties of R-45HT Propellants Lot 606095; Type D[1] Antioxidant

| Properties | | at Temp. (°C.) | Aging (Day) | Mixes | | | | |
|---|---|---|---|---|---|---|---|---|
| | | | | 65 | 61 | 68 | 69 | 70 |
| $\sigma_m$ | (kPa) | 22.8 | 0 | 529 | 650 | 616 | 714 | 578 |
| $\xi_m$ | (%) | " | " | 32.1 | 32.5 | 37.7 | 30.8 | 35.4 |
| E | (kPa) | " | " | 2929 | 3657 | 3210 | 4101 | 3078 |
| $\xi_m$ | (%) | −45.6 | " | 52.5 | 50.8 | 55.9 | 48.9 | 52.5 |
| $\xi_r$ | (%) | " | " | 57.0 | 55.6 | 58.8 | 51.5 | 57.2 |
| $\xi_m$ | (%) | −53.9 | " | 46.7 | 44.9 | 48.2 | 43.1 | 48.7 |
| $\xi_r$ | (%) | " | " | 51.0 | 48.1 | 49.8 | 45.8 | 50.9 |
| $\sigma_m$ | (kPa) | 22.8 | 14 | 635 | 724 | 676 | 800 | 673 |
| $\xi_m$ | (%) | " | " | 29.7 | 30.2 | 33.1 | 27.0 | 32.5 |
| E | (kPa) | " | " | 3940 | 4297 | 3840 | 4836 | 3577 |
| $\sigma_m$ | (kPa) | 22.8 | 28 | 700 | 819 | 731 | 818 | 713 |
| $\xi_m$ | (%) | " | " | 29.7 | 28.6 | 30.1 | 27.7 | 30.9 |
| E | (kPa) | " | " | 4451 | 5089 | 4286 | 4781 | 3932 |
| $\xi_m$ | (%) | −45.6 | " | 51.0 | 44.1 | 45.9 | 45.3 | 49.3 |
| $\xi_r$ | (%) | " | " | 54.8 | 45.9 | 48.4 | 48.1 | 54.7 |
| $\sigma_m$ | (kPa) | 22.8 | 56 | 766 | 816 | 718 | 825 | 779 |
| $\xi_m$ | (%) | " | " | 26.2 | 25.0 | 24.6 | 25.6 | 279 |
| E | (kPa) | " | " | 5428 | 5445 | 5173 | 5260 | 4768 |
| $\xi_m$ | (%) | −45.6 | " | 44.0 | 38.1 | 33.7 | 40.1 | 45.8 |
| $\xi_r$ | (%) | " | " | 47.2 | 40.0 | 35.6 | 41.9 | 48.0 |
| R NCO/OH ratio | | | | 0.725 | 0.75 | 0.75 | 0.75 | 0.75 |
| PAZ (% wt of binder) | | | | 0.8 | 0.8 | 0.4 | 1.2 | 0.8 |
| PAM (% wt of binder) | | | | 0.2 | 0.2 | 0.2 | 0.2 | 0.4 |

[1]Type D antioxidant is a 50/50 mixture of DTBHQ/FLEXZONE 6H.

Comparison Between the Two Lots of R-45HT

The Longer Pot Lives of Propellants Based on Lot 606095

The longer pot lives obtained with Lot 606095 are not easily explicable. Various laboratory tests were conducted on the R-45HT prepolymers Lots 403245 and 606095. No significant difference could be found to date with such tests as the equivalent weight (OH groups), the water content, the GPC and VPO. Viscosity measurements over the temperature range of 20° to 60° C. led to almost identical results for both lots. It is possible, however, that the two-year period elapsed between the manufacturing of Lot 403245 and the addition of an antioxidant could have contributed to a certain deterioration of the prepolymer by homopolymerization. In an attempt to minimize the degradation of the product, the second lot of R-45HT was purchased with the additional specification "that the material must be delivered within six months after its manufacture".

Mechanical Properties

Very little difference could be found between the mechanical properties of propellants based on R-45HT Lot 403245 and those from Lot 606095. The properties of two propellants containing DTBHQ, mix 25 (Lot 403245) and mix 64 (Lot 606095) are compared in Table XII. For nearly identical $\sigma_m$ (681 versus 686 kPa), mix 64 shows slightly higher elongations at low temperature. The reduced values, which are an indication of the stability of the two propellants upon accelerated aging at 60° C., are also nearly the same. Some post-curing is obvious with increases of $\sigma_m$, E and reduction in the elongation.

TABLE XII

Mechanical Properties of R-45HT Propellants Containing 1% DTBHQ (Lots 403245 and 606095)

| | t = 0[1] | t = 56 | Reduced Value t56/t0 |
|---|---|---|---|
| (A) Mix 25, Lot 403245 | | | |
| $\sigma_m$ (kPa) @ 22.8° C. | 681 | 857 | 1.20 |
| $\xi_m$ (%) @ 22.8° C. | 30.5 | 21.7 | 0.71 |
| E (kPa) @ 22.8° C. | 4154 | 7443 | 1.79 |
| $\xi_m$ (%) @ −45.6 | 43.9 | 31.5 | 0.72 |
| $\xi_r$ (%) @ −45.6 | 50.2 | 35.1 | 0.70 |
| $\xi_m$ (%) @ −53.9 | 33.1 | — | — |
| $\xi_r$ (%) @ −53.9 | 41.1 | — | — |
| (B) Mix 64, Lot 606095 | | | |
| $\sigma_m$ (kPa) @ 22.8° C. | 686 | 811 | 1.18 |
| $\xi_m$ (%) @ 22.8° C. | 33.4 | 24.5 | 0.73 |
| E (kPa) @ 22.8° C. | 3742 | 5626 | 1.50 |
| $\xi_m$ (%) @ −45.6 | 52.0 | 38.3 | 0.74 |
| $\xi_r$ (%) @ −45.6 | 58.1 | 40.2 | 0.70 |
| $\xi_m$ (%) @ −53.9 | 45.8 | — | — |
| $\xi_r$ (%) @ −53.9 | 48.9 | — | — |

[1] t = 0 for initial properties.
t = 56 for properties after 56 days of aging at 60° C.

The Preferred Antioxidant(s)

Based on the data collected during this study, it appears difficult to assign a relative value to each of the candidate antioxidants. Because of the unacceptable processing properties of the resulting propellants, three antioxidants (AO-2246, NAUGARD Q and OCTAMINE) were eliminated early during the study. The four other candidates (DTBHQ, FLEXZONE 7L, FLEXZONE 6H and UOP-36) used alone in the case of DTBHQ or in combinations (DTBHQ with the three others) yielded excellent processing characteristics and acceptable mechanical properties. In compositions incorporating a single antioxidant DTBHQ is the only candidate that meets the objective of a pot life of at least 4.5 hours, notwithstanding a more pronounced post-curing effect. Combinations of DTBHQ with one of the p-phenylene diamines (FLEXZONE 7L, FLEXZONE 6H or UOP-36) also yielded excellent results. A preferred combination would be type D (50/50 mixture of DTBHQ/FLEXZONE 6H) on account of its superior mechanical properties.

We claim:

1. A method for the manufacture of a castable propellant which comprises:

(a) mixing together at atmospheric pressure liquid ingredients comprising a hydroxy-terminated butadiene polymer of the structural formula:

$(CH_2-CH=CH-CH_2)_{\overline{6/n}}-OH$ wherein $n=57-65$, a plasticizer, a bonding agent comprising an aziridine polyester, which is the reaction product of an aziridinyl phosphine oxide and a polycarboxylic acid, and an amine polyester, which is the reaction product of an alkalolamine and a saturated aliphatic polycarboxylic acid, and an antioxidant comprising by weight 25%–75% of di-tert-butyl-hydroquinone in conjunction with 75%–25% of one of N-phenyl-N'-(1,3-dimethylbutyl)-p-phenylene-diamine and N-phenyl-N'-cyclohexyl-p-phenylene-diamine, the amount of antioxidant being about 1% by weight of the polybutadiene polymer, (b) adding solid ingredients comprising finely-divided aluminum, ferric oxide as a burning rate catalyst and ammonium perchlorate oxidizer in an amount of about 75% by weight of the total amount of such oxidizer required, and mixing to give a substantially even dispersion, (c) heating the mixture at approximately 60° C. under vacuum for about 1 hour, (d) releasing the vacuum, (e) adding and mixing in the remainder of the ammonium perchlorate oxidizer and a diisocyanate curing agent, (f) reapplying vacuum and heating to about 60° C. for about 45 minutes, and (g) casting the resulting mixture in molds under vacuum.

2. The method according to claim 1 in which the diisocyanate curing agent is added and admixed prior to addition of the remainder of the ammonium perchlorate oxidizer.

3. The method as claimed in claim 1 in which the antioxidant comprises by weight about 50% of di-tert.-butyl hydroquinone and about 50% of N-phenyl-N'-cyclohexyl-p-phenylene-diamine.

4. The method as claimed in claim 1 in which the antioxidant comprises by weight about 50% of di-tert.-butyl hydroquinone and about 50% of N-phenyl-N'-(1,3-dimethyl-butyl)-p-phenylene-diamine.

5. The method as claimed in claim 1 in which the burning rate catalyst is of from about 0.1 to 1% of ferric oxide by weight of the total propellant.

6. The method as claimed in claim 1 in which the oxidizer is present as a di- or trimodal distribution of an average particle size in the range from 1 to 400 μm.

7. The method as claimed in claim 1 in which the metal additive has an average particle size in the range of 5 to 50 μm.

8. The method of claim 1 wherein step (a) comprises mixing the polymer, the plasticizer and the antioxidant, and subsequently admixing the bonding agent of aziridine polyester and amine polyester.

* * * * *